United States Patent
Haas, Jr. et al.

(10) Patent No.: US 10,131,315 B2
(45) Date of Patent: Nov. 20, 2018

(54) FLEXIBLE HOLDING ELEMENT FOR REMOVABLY ATTACHING AN ELEMENT OF AN AIRBAG

(71) Applicant: Autoliv ASP, Inc., Ogden, UT (US)

(72) Inventors: Martin Haas, Jr., Altomünster (DE);
Thomas Reiter, Vierkirchen (DE);
David Keyser, Orion, MI (US)

(73) Assignee: Autoliv ASP, Inc., Ogden, UT (US)

( * ) Notice: Subject to any disclaimer, the term of this patent is extended or adjusted under 35 U.S.C. 154(b) by 22 days.

(21) Appl. No.: 15/264,458

(22) Filed: Sep. 13, 2016

(65) Prior Publication Data

US 2018/0072259 A1    Mar. 15, 2018

(51) Int. Cl.
*B60R 21/235*     (2006.01)
*B60R 21/239*     (2006.01)
(Continued)

(52) U.S. Cl.
CPC ........ *B60R 21/2342* (2013.01); *B60R 21/235* (2013.01); *B60R 21/239* (2013.01);
(Continued)

(58) Field of Classification Search
CPC .............. B60R 21/233; B60R 21/2338; B60R 21/2342; B60R 21/2346; B60R 21/237;
(Continued)

(56) References Cited

U.S. PATENT DOCUMENTS 5,560,649 A * 10/1996 Saderholm ............ B60R 21/233
                                               280/739
6,554,316 B2 * 4/2003 Schneider ............ B60R 21/233
                                               280/729
(Continued)

FOREIGN PATENT DOCUMENTS

WO    WO-2009034752 A1 * 3/2009 ........... B60R 21/233
WO    WO 2014/029473      2/2014
WO    WO-2015107010 A1 * 7/2015 ......... B60R 21/2342

OTHER PUBLICATIONS

PCT/2017/048421 International Search Report, dated Nov. 8, 2017 (2 pgs).
PCT/2017/048421 Written Opinion, dated Nov. 8, 2017 (5 pgs).

*Primary Examiner* — Laura Freedman
(74) *Attorney, Agent, or Firm* — Matthew D. Thayne; Thayne and Davis LLC

(57) ABSTRACT

Holding elements for attaching an element of an airbag assembly to a holding unit comprising such a holding element and an inflating element, along with related methods. In some embodiments, the holding element may be configured for attaching an element of an airbag assembly via at least one tear seam, and the holding element may comprise a first side wall made of a flexible material and a second side wall made of a flexible material. A peripheral connection may couple the first side wall and the second side wall and may extend from a first end to a second end such that the first side wall, the second side wall, and the peripheral connection define a space therebetween and an opening. The holding element may further comprise an inlay comprising a hole and having at least one layer being located between the first side wall and the second side wall.

14 Claims, 14 Drawing Sheets

(51) Int. Cl.
  *B60R 21/264* (2006.01)
  *B60R 21/2338* (2011.01)
  *B60R 21/2342* (2011.01)

(52) U.S. Cl.
  CPC ........ *B60R 21/2338* (2013.01); *B60R 21/264* (2013.01); *B60R 2021/2395* (2013.01); *B60R 2021/23382* (2013.01); *B60R 2021/23384* (2013.01); *B60R 2021/23504* (2013.01); *B60R 2021/23509* (2013.01); *B60R 2021/23576* (2013.01)

(58) Field of Classification Search
  CPC ................ B60R 21/239; B60R 21/264; B60R 2021/23332; B60R 2021/23382; B60R 2021/23384; B60R 2021/2395; B60R 2021/23576; B60R 21/235; B60R 2021/23509; B60R 2021/23504
  See application file for complete search history.

(56) References Cited

U.S. PATENT DOCUMENTS

| | | | |
|---|---|---|---|
| 6,648,371 B2 | 11/2003 | Vendely et al. | |
| 7,556,290 B2 * | 7/2009 | Williams | B60R 21/2338 280/743.1 |
| 7,597,356 B2 * | 10/2009 | Williams | B60R 21/2338 280/736 |
| 7,681,914 B2 * | 3/2010 | Maidel | B60R 21/239 280/729 |
| 7,748,738 B2 * | 7/2010 | Schneider | B60R 21/2338 280/729 |
| 7,770,926 B2 * | 8/2010 | Schneider | B60R 21/2338 280/739 |
| 7,845,678 B2 * | 12/2010 | Pausch | B60R 21/2338 280/735 |
| 8,608,197 B2 | 12/2013 | Eckert et al. | |
| 9,022,424 B2 * | 5/2015 | Nakamura | B60R 21/2338 280/739 |
| 9,376,086 B2 | 6/2016 | Nebel et al. | |
| 9,403,503 B2 * | 8/2016 | Buchholz | B60R 21/239 |
| 9,676,360 B2 * | 6/2017 | Weber | B60R 21/217 |
| 2003/0222434 A1 | 12/2003 | Okada et al. | |
| 2005/0087959 A1 * | 4/2005 | Heuschmid | B60R 21/231 280/728.2 |
| 2015/0314747 A1 | 11/2015 | Weber et al. | |
| 2015/0329073 A1 | 11/2015 | Buchholz et al. | |
| 2016/0214562 A1 * | 7/2016 | Kalandek | B60R 21/235 |
| 2016/0325706 A1 | 11/2016 | Haas et al. | |

* cited by examiner

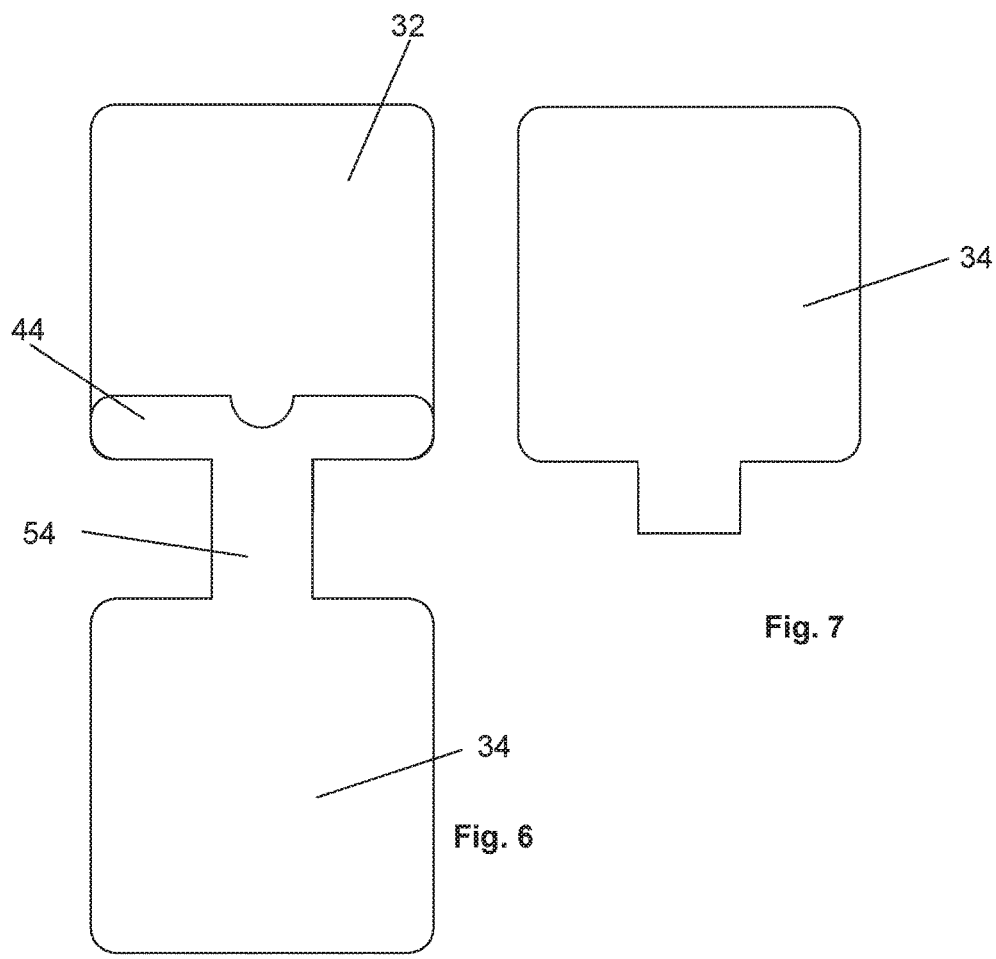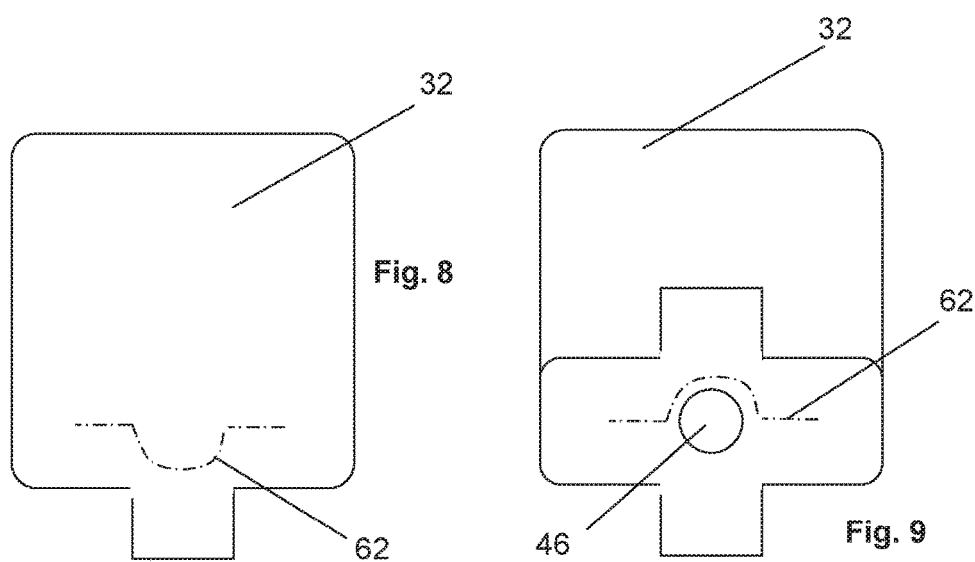

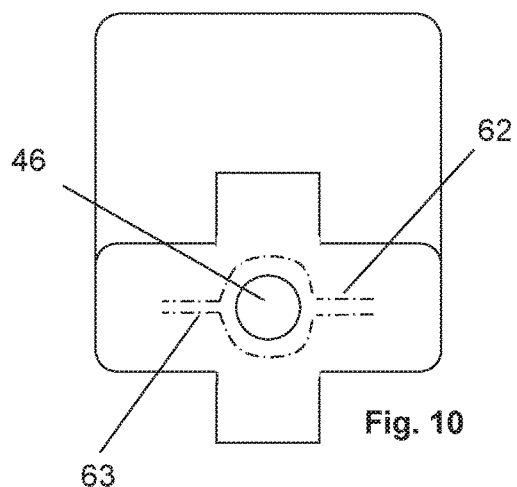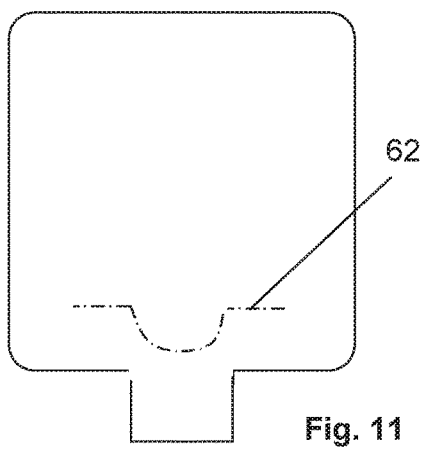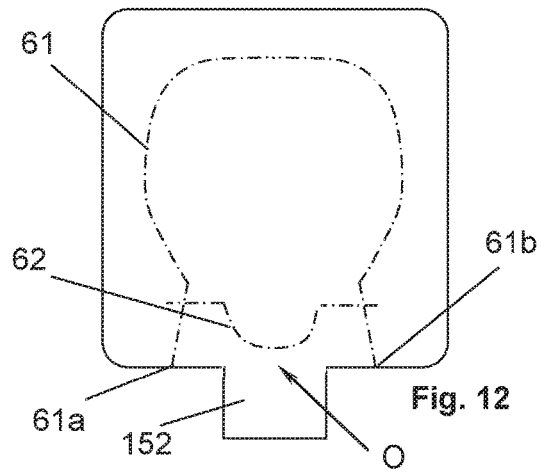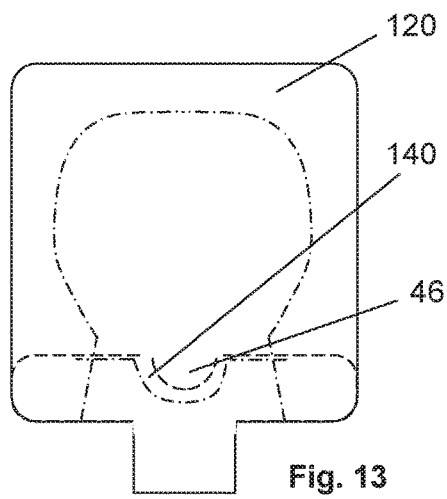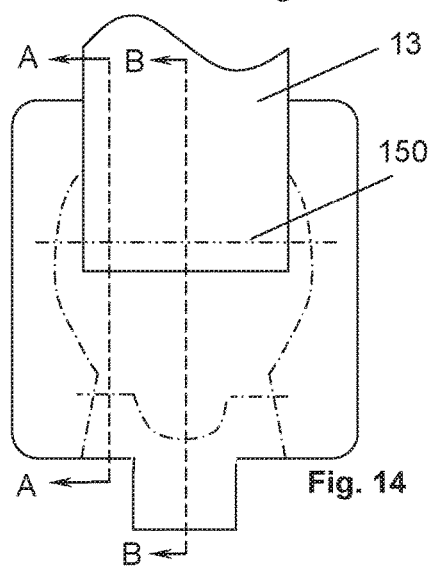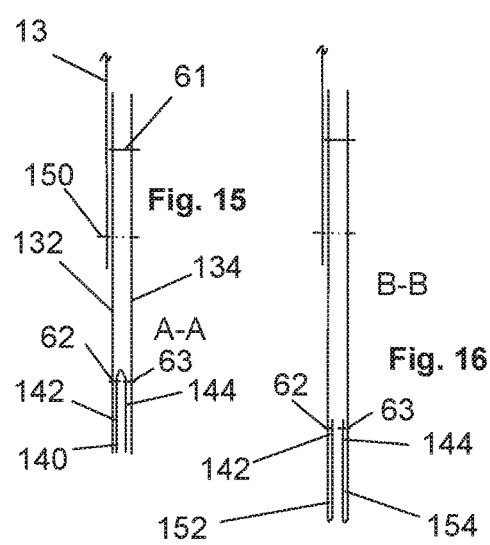

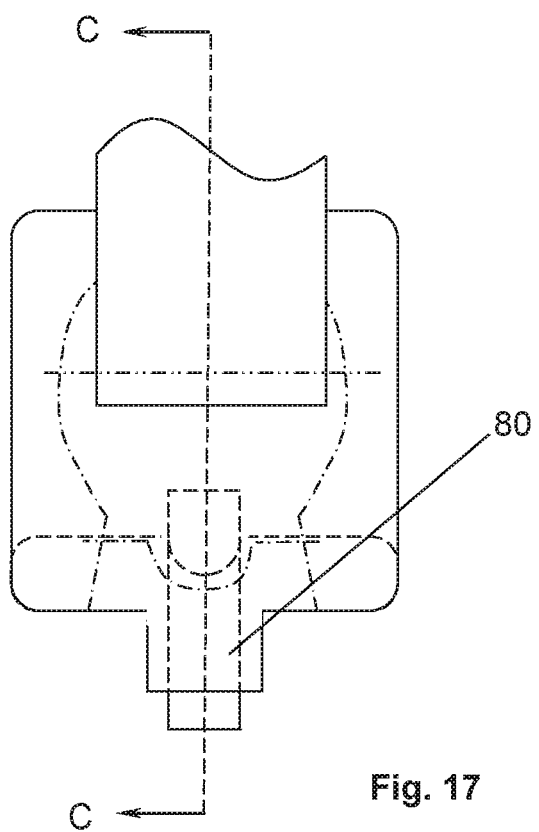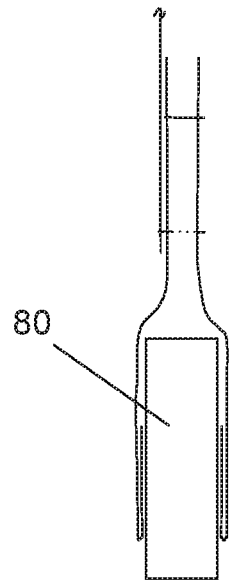
Fig. 17  C-C  Fig. 18

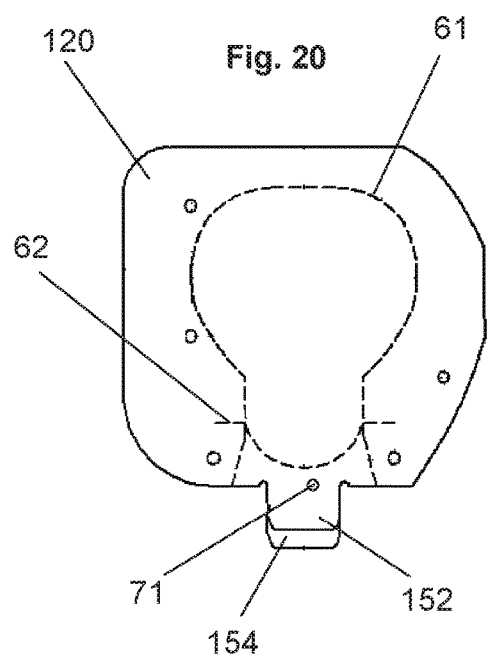
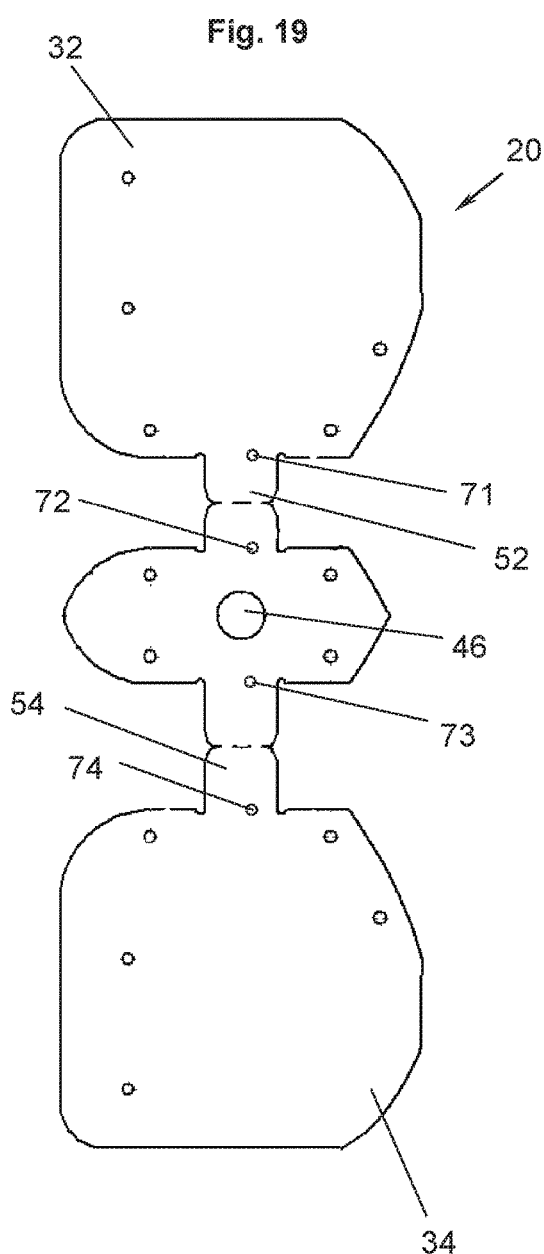
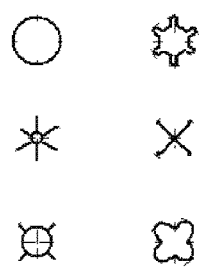
Fig. 21

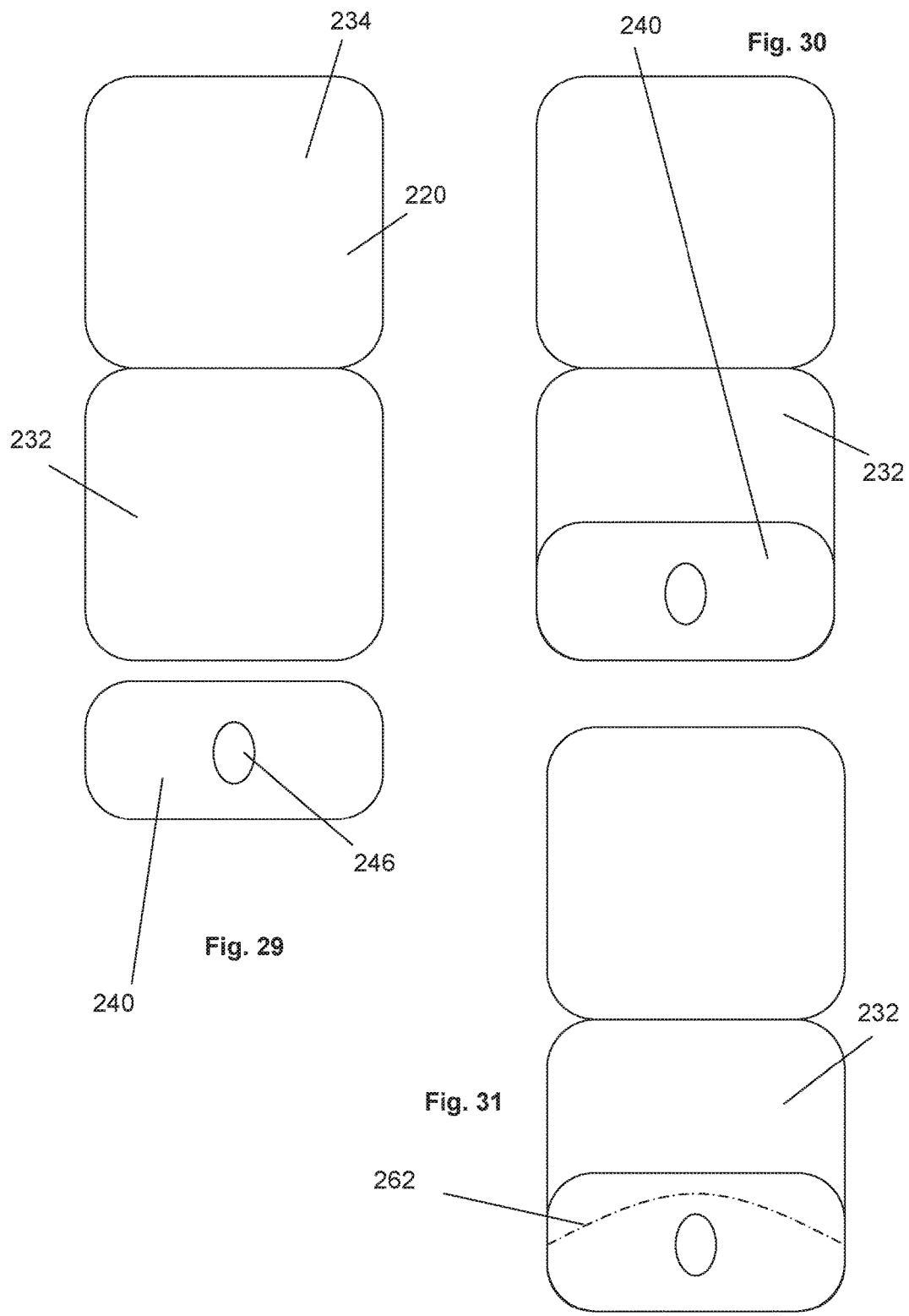

FLEXIBLE HOLDING ELEMENT FOR REMOVABLY ATTACHING AN ELEMENT OF AN AIRBAG

SUMMARY

The present invention relates to automotive safety. More specifically, in preferred embodiments, the present invention relates to a holding element, such as a flexible holding element, for attaching an element of an airbag to a holding unit comprising such a holding element and an inflating element, an airbag unit comprising such a holding unit and an airbag cushion, and to a method for producing such a holding element.

It is well known in the airbag technology to provide an airbag unit, especially a frontal airbag unit, with a holding element which removably holds an element of the airbag of this airbag unit. This element can for example be a tether which is connected directly to the airbag cushion or to a ventilation device which is in turn connected to the airbag cushion. But this element can also be a part of the airbag cushion or a part of the ventilation device itself. Most often the element is a tether. By the use of such holding elements it is possible to actively influence the depth of the airbag cushion or its venting behaviour. For example from U.S. Pat. No. 6,648,371, such a holding unit is known. Here, one end of a tether is connected to a bolt of an actuator. The actuator comprises a pyrotechnic load and on actuation of the same the bolt is de-attached and the end of the tether is released.

An advanced holding unit is known from WO 2014/029473. Here the holding unit is comprised of an often so-called micro bag which forms a holding element and an inflating element for inflating this holding element (micro bag). This holding element is comprised of two side walls and a peripheral connection in form of a peripheral seam connecting these two side walls, such that a gas space is defined by the two side walls and the peripheral connection. The peripheral connection is not closed. Rather, it extends from a first end to a second end such that an opening connecting the gas space inside the holding element with the exterior is defined. An inflating element in form of a pyrotechnic squib extends through this opening such that on actuation of this inflating element the gas space is filled and the holding element thus expands. A tether (or another part of the airbag) is sewn to this holding element by means of a tear seam. This tear seam extends through the tether and through the two side walls. When the holding element expands due to the actuation of the inflating element, the distance between the two side wall rises and the tear seam tears leading to a release of the tether. The generic holding unit is cost effective to produce, light weight, and reliable.

It is therefore an object of some embodiments of the invention to further improve the generic holding unit.

It has been found out that, due to manufacturing tolerances, the gas tightness between the inflator, which extends through the opening into the gas space of the holding element and the holding element itself is necessarily not perfect. In order to compensate for that, the gas space to be filled by gas may, in some embodiments, exceed about 15 $cm^3$ in the deployed state and, accordingly, an inflating element that is powerful enough to fill this gas space may be used. It is, of course, desired to reduce the volume of the space to be filled by gas such that a weaker inflating element can be used and in order to save packaging volume. In order to achieve this, an improved sealing between the inflating element and the holding element is provided by one or more of the embodiments disclosed herein.

For this purpose, the holding element may additionally comprise an inlay that may be located between the first side wall and the second side wall. A hole may be cut (such as a laser cut) or stamped into this inlay. Since this hole is cut or stamped, its size and shape can be determined very precisely with a tolerance which is close to zero. Consequently, the size and/or shape of this hole can be chosen such that it matches very closely the circumference of the part of the inflating element passing through it such that a very tight sealing without further measurements can be achieved. As a consequence of this a small volume of the holding element, a relatively weak inflating element can be chosen.

In a first preferred embodiment, the inlay may be double-layered with a first layer and a second layer, wherein these two layers are connected to each other via a fold. Here, the hole may extend from the first layer over the fold to the second layer. This embodiment may have several advantages, including, for example, that the holding element is symmetrical, which is often preferred. Further, the holding element can be manufactured from a single cutting, which is also often preferred. Finally, a very good gas tightness can be achieved.

Usually it will be necessary to connect the first layer with the first side wall and the second layer with the second side wall to achieve the desired gas tightness. Because of the high pressure applied to the holding element on ignition of the inflator, these two connections are preferably in the form of seams.

In a second preferred embodiment, the inlay may be single-layered, which often makes an even more simple production with a minimum of material possible.

The features, structures, steps, or characteristics disclosed herein in connection with one embodiment may be combined in any suitable manner in one or more alternative embodiments.

BRIEF DESCRIPTION OF THE DRAWINGS

The invention will now be described in more detail by means of preferred embodiments in view of the drawings. The drawings show:

FIGS. 5-12 depict the cuttings of FIGS. 1 and 2 in subsequent production steps, wherein FIG. 12 shows the finished holding element;

FIG. 13 depicts the holding element of FIG. 12 in a presentation where hidden lines are shown;

FIG. 14 depicts the holding element of FIG. 12 after a tether has been sewn to the holding element;

FIG. 15 is a sectional view taken along line A-A in FIG. 14;

FIG. 16 is a sectional view taken along line B-B in FIG. 14;

FIG. 17 depicts the items shown in FIG. 14 after an inflator in the form of a pyrotechnic squib has been partially inserted into the holding element;

FIG. 18 is a sectional view taken along line C-C in FIG. 17;

FIG. 19 depicts an alternative embodiment to that shown in FIG. 3, namely, a cutting for a holding element;

FIG. 20 depicts the holding element manufactured from the cutting shown in FIG. 19;

FIG. 21 shows several possible shapes for the hole in the inlay;

FIG. 29 depicts a cutting and an additional cutting for manufacturing another embodiment of a holding element;

FIGS. 30-36 depict examples of various production steps for manufacturing a holding element from the parts shown in FIG. 29 with FIG. 36 showing the completely manufactured holding element;

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
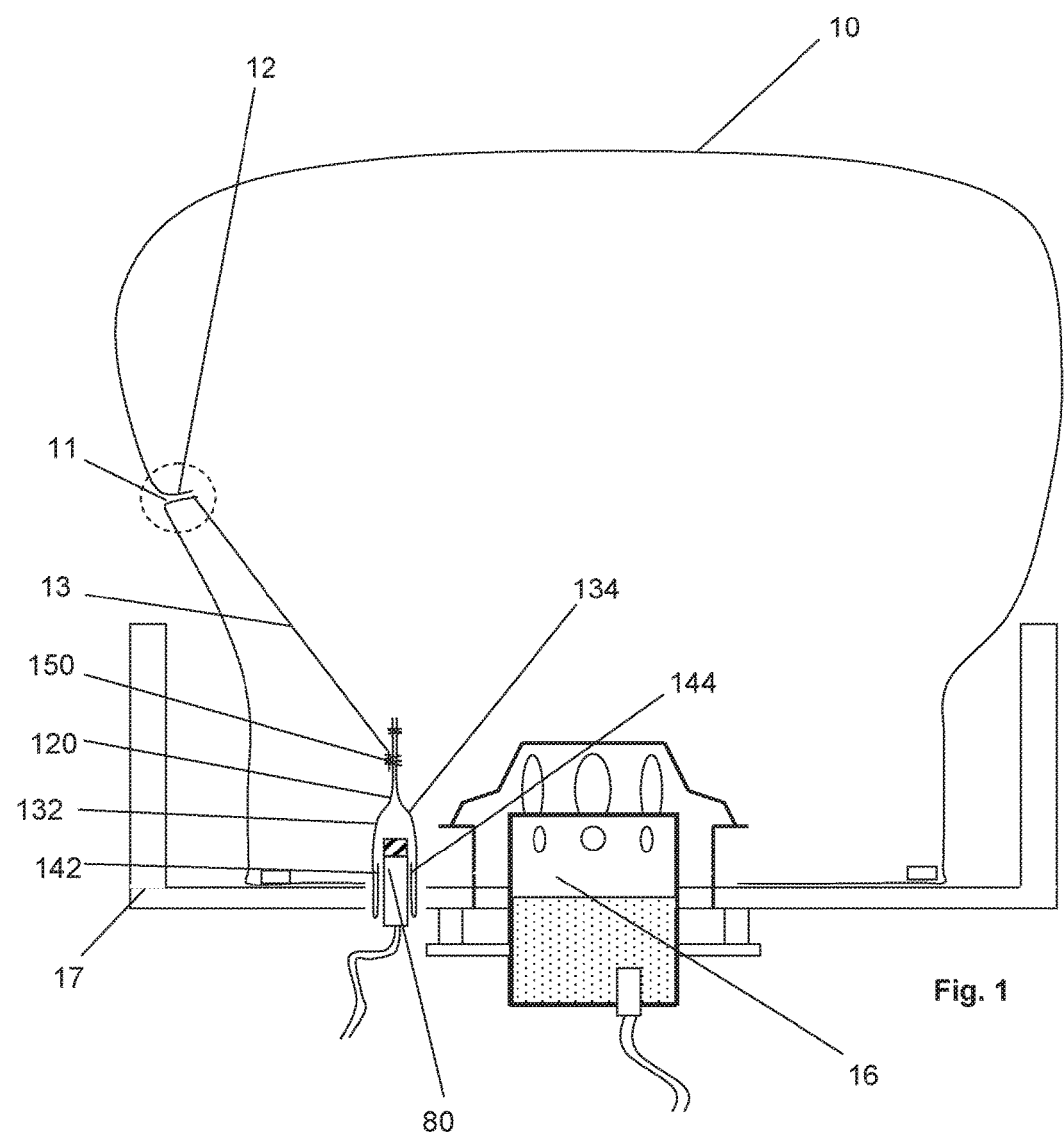
FIG. 1 is a schematic sectional view of an airbag unit comprising an airbag cushion and a holding unit, wherein the holding unit is not yet activated.

FIG. 1 shows a schematic sectional view through an airbag unit, especially a frontal airbag unit. This airbag unit comprises a housing 17, a main gas generator 16, an airbag cushion 10. A ventilation hole 11 is provided in the airbag cushion 10 and a rim 12 extends around this ventilation hole 11. A tether 13 extends from this rim 12 such that when the tether 13 is under mechanical tension gas is hindered from streaming from the inside of the airbag cushion 10 to the outside. This tether 13 extends from the rim 12 to the holding element (micro bag) 120 of a holding unit. It is sewn to this holding element 120 by means of a tear seam 150. The holding unit further comprises an inflator 80 (also referred to as inflating element) which is usually in form of a pyrotechnic squib. This inflator 80 extends into the inside of the holding element 120. A part of the space between the two side walls 132, 134 constitutes a gas space. As can schematically be seen from FIG. 1, this holding element 120 comprises a first side wall 132, and a second side wall 134.

Figure 2:
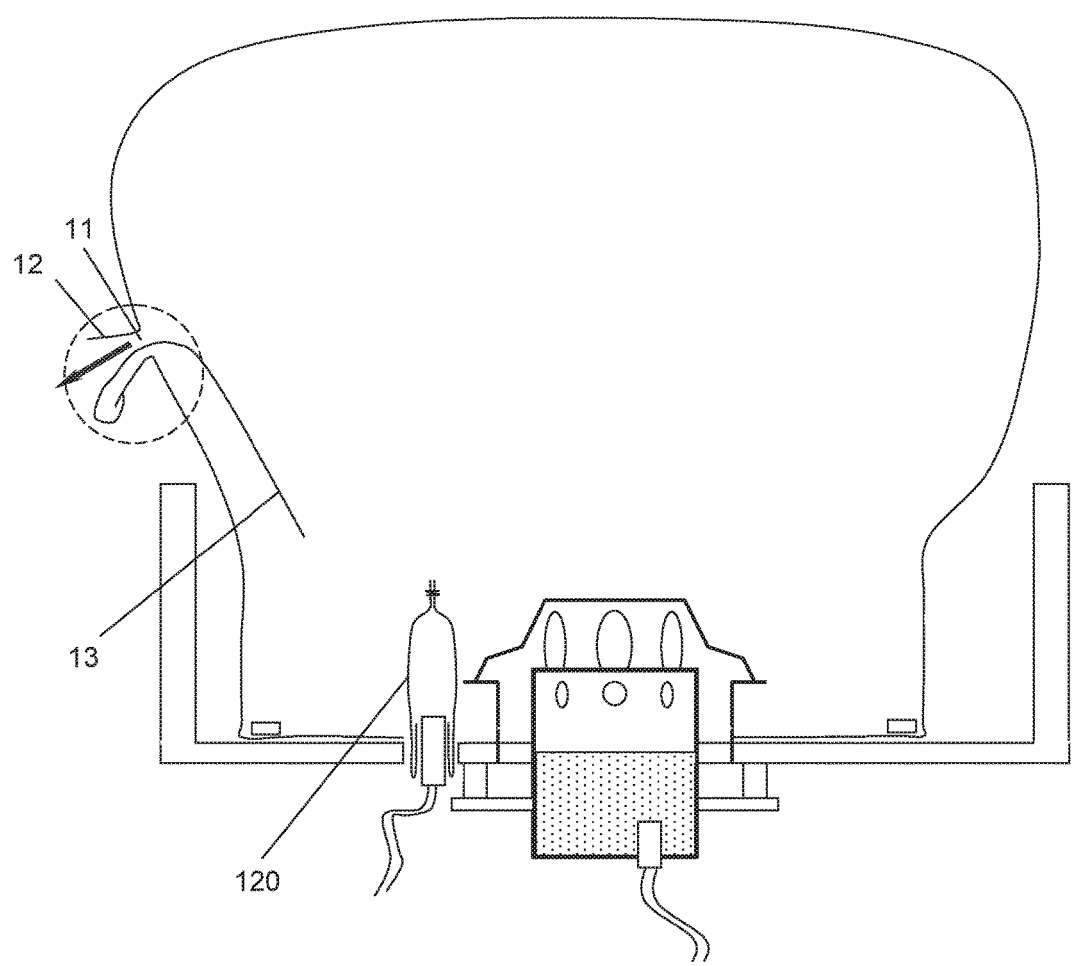
FIG. 2 depicts the items shown in FIG. 1 after the holding unit has been activated.

When the inflator 80 is ignited, the micro bag 120 expands and the tear seam 150 tears such that the tether 13 is released (FIG. 2). The holding element 120 has a novel structure that, as shown in the figures, additionally comprises an inlay between the two side walls, namely, the first side wall 132 and the second side wall 134. In the first depicted embodiment, this inlay is in form of a double-layered inlay with a first layer 142 and a second layer 144.

Figure 3:
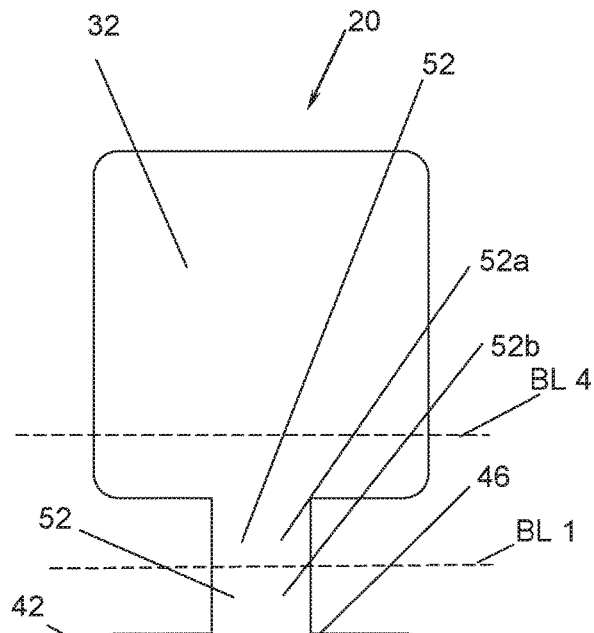
FIG. 3 depicts a cutting for manufacturing the holding element of the holding unit of FIGS. 1 and 2.

With reference to FIGS. 3-16 it will now be described how the holding element 120 shown in FIGS. 1 and 2 can be manufactured from a single cutting 20, as is shown in FIG. 3. It needs to be emphasized that the manufacturing of this inlay from a single cutting having a shape as shown in FIG. 3 (or similar) is preferred but not mandatory in order to achieve the main advantages of the inventive holding element.

With reference to FIG. 3 the cutting 20 will now be described in detail. This cutting 20 may comprise five sections, namely, the first side wall section 32, the first connecting section 52, the middle section 40, the second connecting section 54, and the second side wall section 34. In some embodiments, the two side wall sections 32, 34, and the middle section 40, may have the same width and the two connecting sections 52, 54 may have a reduced width relative to the width of the side wall sections 32, 34. The two side wall sections 32, 34 are preferably congruent. The first connecting section 52 connects the first side wall section 32 and the middle section 40 and the second connecting section 54 connects the second side wall section 34 and the middle section 40. The two connecting sections 52, 54 may be symmetrical to one another, as depicted in the embodiment shown in FIG. 3.

A hole 46 is provided in the middle section 42 (preferably in the middle of the same). This hole may be formed, for example, by laser-cutting or stamping, but laser-cutting may be preferred for certain applications. The cutting 20 is preferably made of a flexible material, such as, in some embodiments, of a woven plastic material. In some embodiments, cutting 20 can be made from the same material as the airbag cushion 10.

In the depicted embodiment, the cutting 20 is symmetrical, which is not required for all embodiments, as discussed below, but usually the two side wall sections 32 and 34 will have an identical shape.

Four bending lines BL1 to BL4 are also shown in FIG. 3. These bending lines are, of course, not physically present in the cutting 20, but the representation of the bending lines in FIG. 3 helps to understand the manufacturing process described hereinafter.

The first bending line BL1 extends through the first connecting section 52 and "divides" the same in a first area 52a and a second area 52b. The second bending line BL2

"divides" the middle section 40 into a first area 42 and a second area 44. The second bending line BL2 extends through the hole 46. A third bending line BL3 "divides" the second connecting section 54 into the first area 54a and the second area 54b. Finally, a fourth bending line BL4 extends through the first side wall section 32. The distance of the fourth bending line BL4 from the first bending line BL1 may, in some embodiments, be the same as the distance of the second bending line BL2 from the first bending line BL1.

Figure 4:
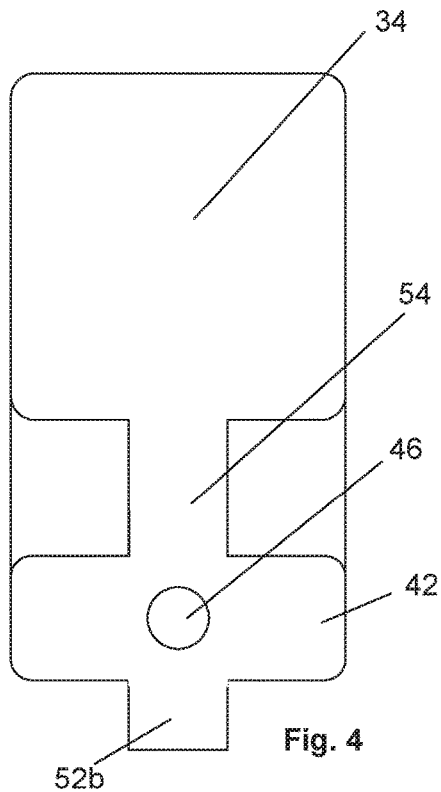
FIG. 4 depicts the cutting of FIG. 3 after the first production step.
Figure 5:
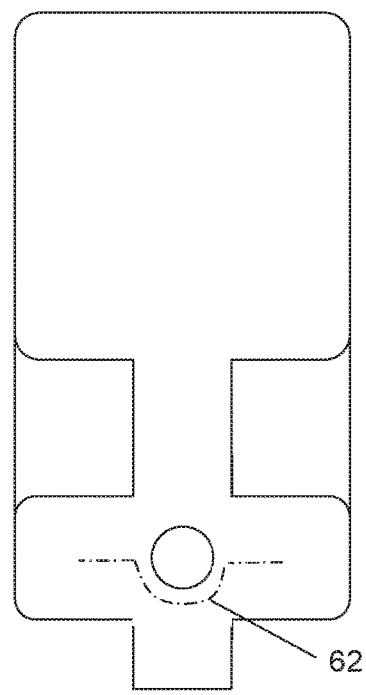

In a first step of some preferred implementations, the cutting 20 is folded along the first bending line BL1. The result of this is shown in FIG. 4. Then, a first sealing connection in form of the first sealing seam 62 may be applied. This first sealing seam 62 connects the first area 42 of the middle section 40 with the first side wall section 32. The first sealing seam 62 extends in the direction of the width of the cutting and around one side the hole 46 (FIG. 5).

Then, the cutting 20 may be folded along the second bending line BL2. The outcome of this is shown in FIG. 6. The next folding may take place along the third bending line BL3 such that the two side wall sections lie on top of each other (FIG. 7). In the depicted embodiment, the second side wall section 34 is on top. As can be seen from FIG. 8, the cutting 20 is now turned around such that the first side wall section 32 is on top and that the first sealing seam 62 can be seen. In this state, the fourth bending line BL4 is on top of the second bending line BL2 and the next bending is performed along these two bending lines such that the middle section 40 is on top (FIG. 9).

Then, the second sealing connection in form of the second sealing seam 63 may be applied. This second sealing seam 63 connects the second area 44 of the middle section 40 to the second side wall section 34. This second sealing seam 63 is preferably symmetrical to the first sealing seam 62 and runs around the hole 46 opposite to the first sealing seam 62. Both sealing seams 62, 63 may extend in both directions laterally towards the left and right edges of the cutting (FIG. 10).

Then, the folding along second bending line BL2 and fourth bending line BL4 may be reversed such that the two side wall sections 32, 34 lie on top of each other (preferably congruently) such that the now folded middle section 44 is placed between the two side wall sections 32, 34 (FIG. 11). Thereafter, the peripheral connection in form of a peripheral seam 61 may be applied. This peripheral seam 61 connects the two side wall sections 32, 34 to one another and also connects the two areas 42, 44 of the middle section 40 to one another and to the side wall sections 32, 34. This peripheral seam 61 extends from a first end 61a to a second end 61b such that an opening O is defined between those two ends. Additionally, this peripheral seam 61 crosses the two sealing seams 62, 63, which are placed on top of each other. FIG. 13 depicts the same structure as FIG. 12 but with the (not visible) middle section in dotted lines.

The manufacturing process of the holding element 120 is now finished and, according to the definitions chosen in this disclosure, the first side wall section 32 transformed into or became the first side wall 132, the second side wall section 34 transformed into or became the second side wall 134 and the middle section 40 transformed into or became the doubled layered inlay 140 being comprised of the first layer 142 and a second layer 144. These two layers are connected to one another via a fold along the second bending line BL2 and the hole 46 extends over this fold from the first layer 142 to the second layer 144. Additionally, the first connecting section 52 has transformed into or become a first double-layered extension 152 and the second connecting section 54 has transformed into or become a second double-layered extension 154 (please also see FIGS. 15 and 16) extending from the main body of the holding element consisting of the two side walls 32, 34 and the double-layered inlay 140. These double-layered extensions 152, 154 can serve for connecting the holding element 120 to another part of the airbag unit (for example the housing), as will be described later with the variation of the first embodiment shown in view of FIGS. 19 to 23.

After the finish of the manufacturing process of the holding element 120, a tether 13 (or a part of the airbag cushion 10 or a part of a ventilation element (not shown)) may be attached to the two side walls 132, 134 by means of a tear seam 150 (FIG. 14). The tear seam 150 extends through the gas space defined by the two side walls and the peripheral seam 61 and preferably crosses the peripheral seam 61 at two points, such that it divides the gas space into two parts.

As one can see from FIGS. 12-14, the hole 46 in the double-layered inlay 140 is spaced from the opening O defined via the two ends 61a, 61b of the peripheral seam 61 such that the space between the two side walls is divided into two sections, namely, a main space above the fold and entry section below the fold. In preferred embodiments and implementations, only the main space is filled with gas and thus forms a gas space.

To complete the holding unit, an inflator (or inflating element), usually in form of a cylindrical pyrotechnic squib, may be inserted into the space through the opening O defined by the two ends 61a, 61b of the peripheral seam 61 and the hole 46 in the double-layered inlay 140, as is shown in FIGS. 17 and 18. The hole 46 in the double-layered inlay 140 preferably matches, or at least substantially matches, the diameter of the inflator 80 such that a gas-tight sealing between the gas space and the inflator 80 is provided. The opening O defined by the two ends 61a, 61b of the peripheral seam 61 does not need to contribute to the gas tightness.

FIG. 19 shows a variation of a cutting 20 and FIG. 20 shows the holding element 120 manufactured from this cutting 20. The basic structure of the cutting 20 may be the same as described above with the following differences. First, the two connecting sections 52 and 54 are not formed of the same length and securing holes 71-74 are provided in the connecting sections 52, 54. The other holes shown in FIG. 19 are for positioning purposes during the folding and sewing process.

Various possible shapes of the hole 46 are shown in FIG. 21.

The unequal length of the two connecting sections 52, 54 leads to an unequal length of the first double-layered extension 152 and the second double-layered extension 154, which makes it easier to grab those during mounting the holding element 120 to another part of the airbag unit (for example, the housing).

Figure 22:
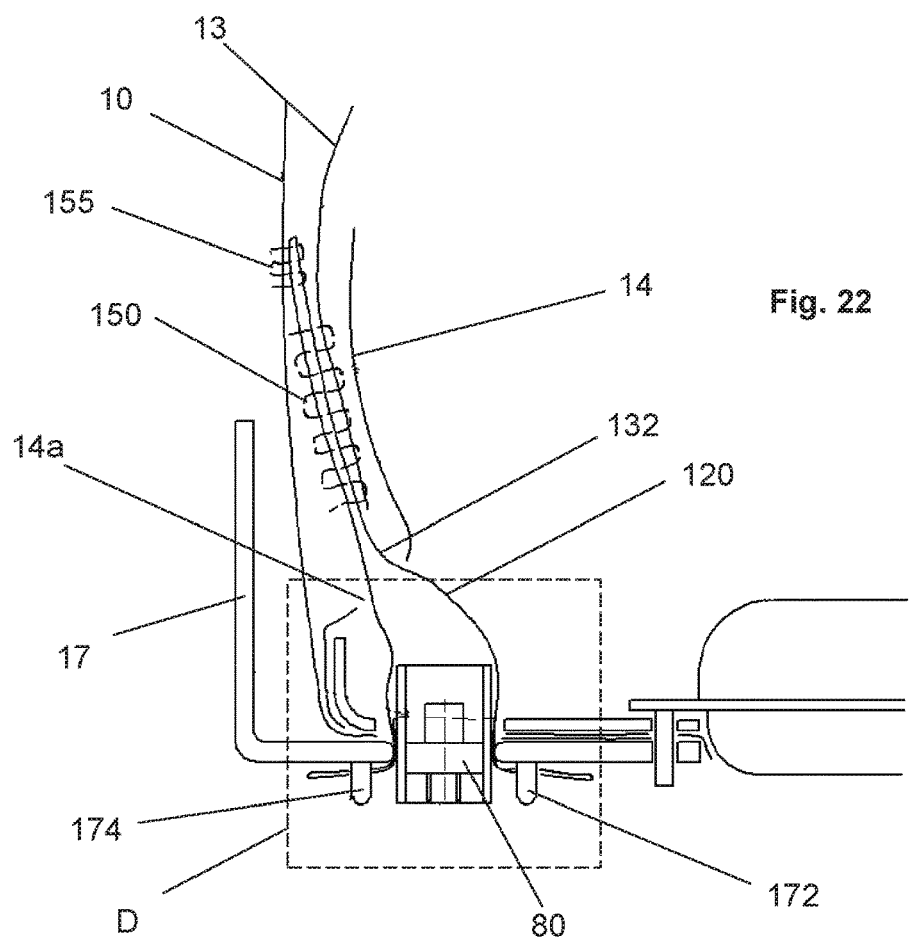
FIG. 22 depicts the holding element of FIG. 20 mounted to the housing of an airbag unit with an inflator extending into this holding element such that a holding unit is formed.
Figure 23:
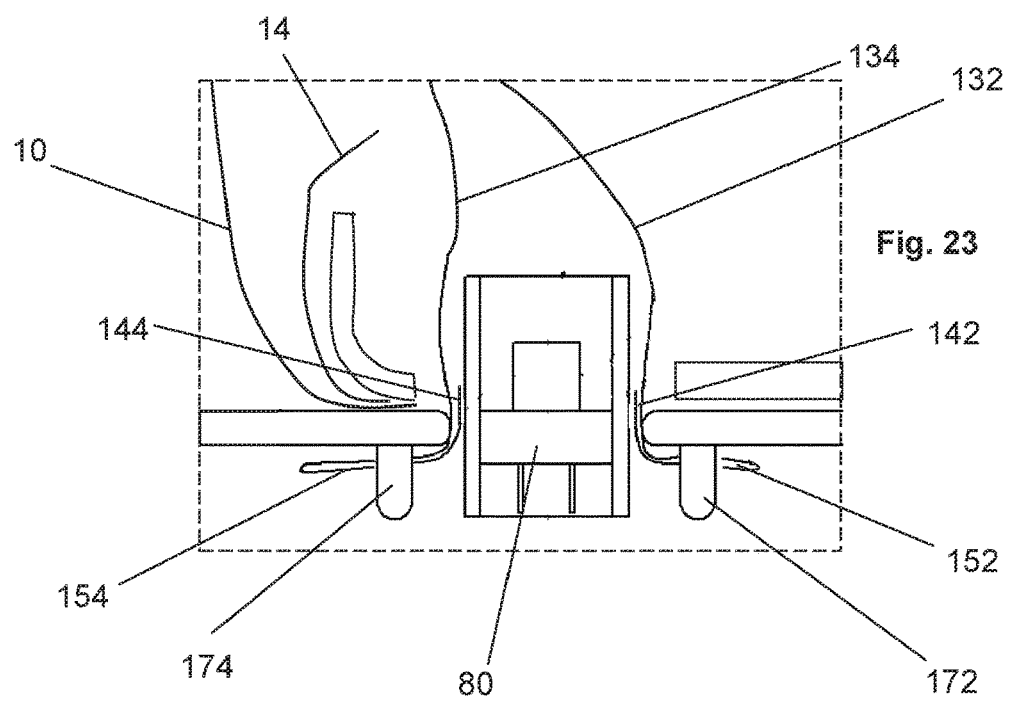
FIG. 23 shows the detail D of FIG. 22.

The first and second securing hole 71, 72 are configured to secure the holding element 120 to a first securing pin 172 and the third and fourth securing hole 73, 74 are configured to secure the holding element 120 to a second securing pin 174 of an airbag housing, as is shown in FIG. 22. This figure shows a completely mounted state of a holding unit being comprised of the holding element 120 and an inflator 80 to the housing 17 of an airbag unit. The main part of the holding element 120 is located inside the airbag cushion 10. In FIG. 22, one can further see a part of the airbag cushion 10. More particularly, the tether 13 is depicted as coupled (such as, for example, sewn) to the holding element 120 by means of the tear seam 150 as well as a protection layer 14 of the airbag unit. One can see in FIG. 22 that the holding element 120 is fixed to the airbag cushion 10 by means of a positioning seam 155 and that the holding element 120 extends through an opening 14*a* of the protection layer. FIG. 23 shows the detail D of FIG. 22.

Figure 24:
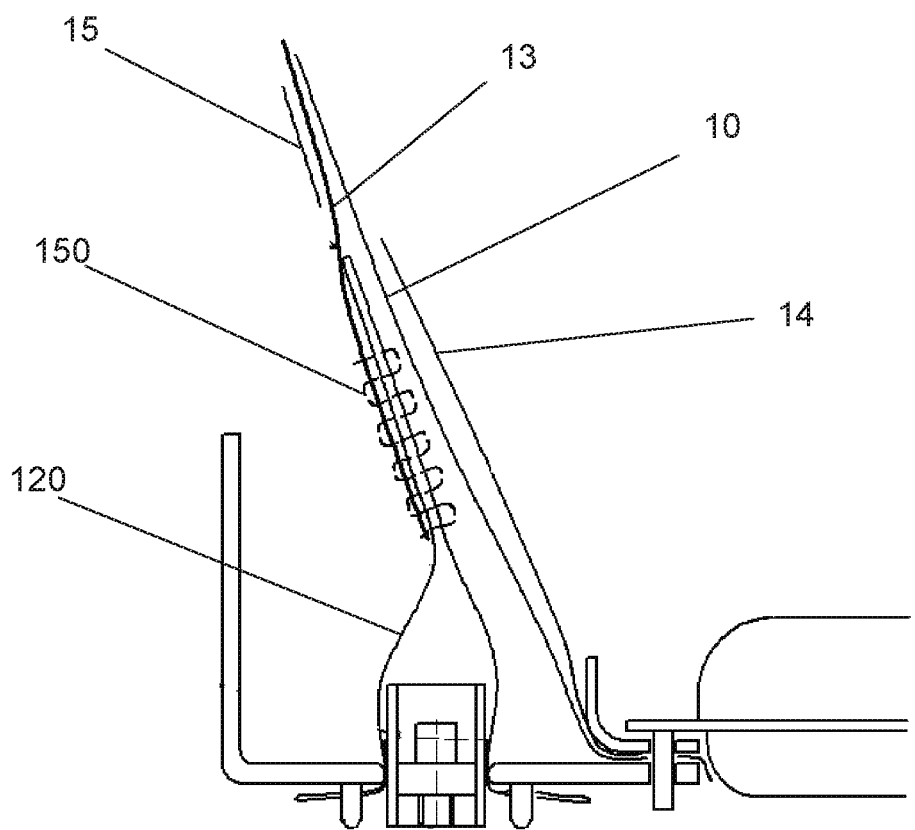
FIG. 24 depicts an alternative embodiment to that shown in FIG. 22.
Figure 25:
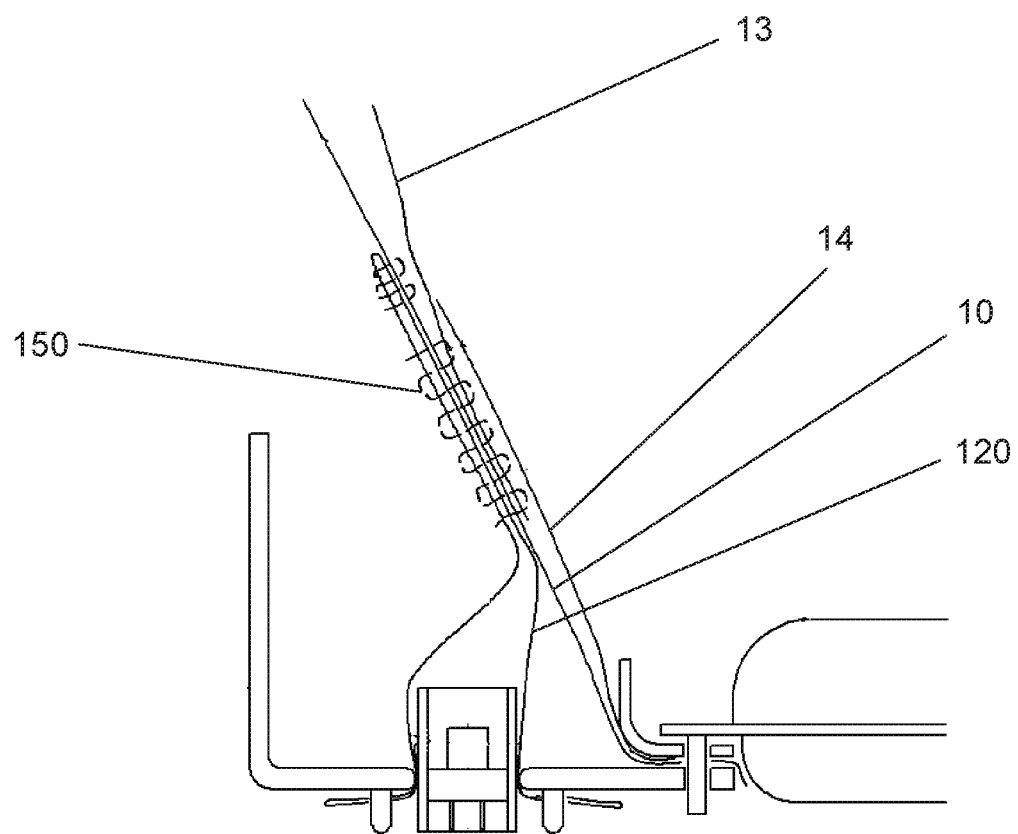
FIG. 25 depicts another alternative embodiment to that of FIG. 22.
Figure 26:
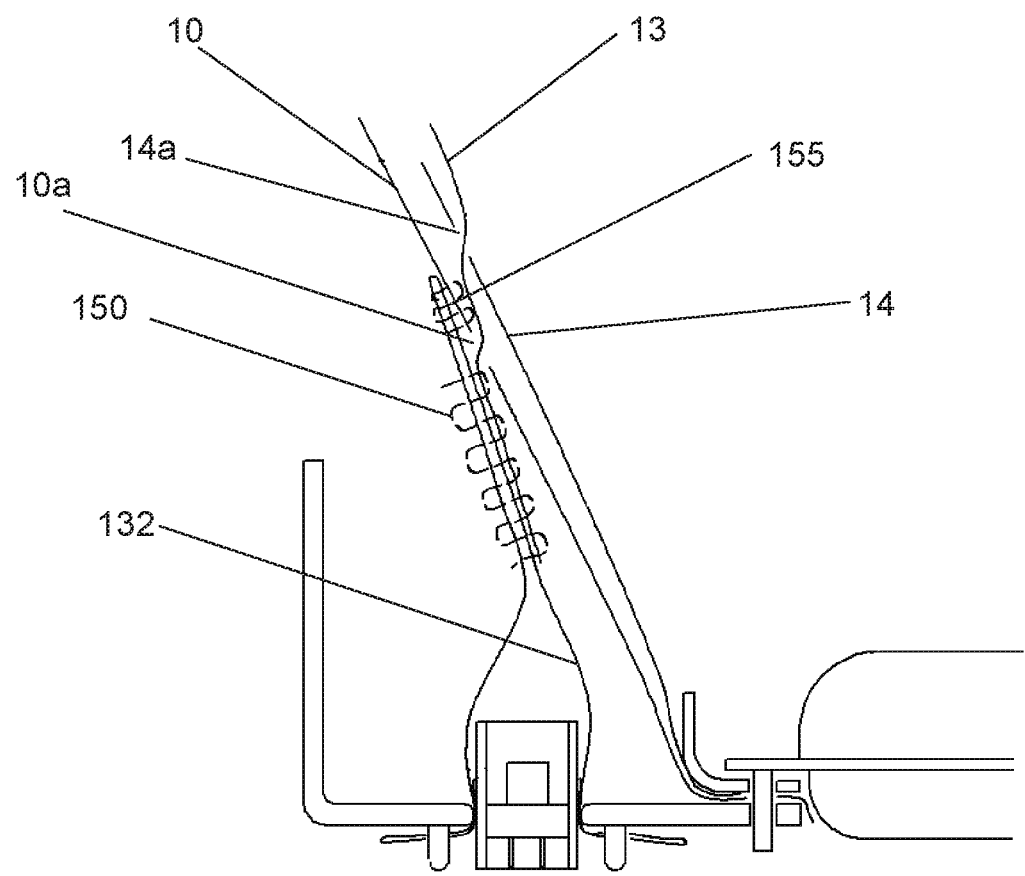
FIG. 26 depicts yet another alternative embodiment to that of FIG. 22.

FIG. 24 shows an alternative position of the holding unit of the airbag unit. Here, the holding unit (and especially the holding element 120) is located outside the airbag cushion 10. In order to guide the tether 13, a tunnel 15 attached to the airbag cushion 10 can be provided. In the alternative embodiment of FIG. 25, the holding element 120 is also located outside the airbag cushion 10, but the tether 13 is located inside the airbag cushion 10 and the tear seam 150 extends through the airbag cushion 10. In the alternative embodiment of FIG. 26, an opening 10*a* is provided in the airbag cushion 10 such that the tether 13 extends through the airbag cushion 10. In the depicted embodiment, the tether also extends through an opening 14*a* in the protection layer.

Figure 28:
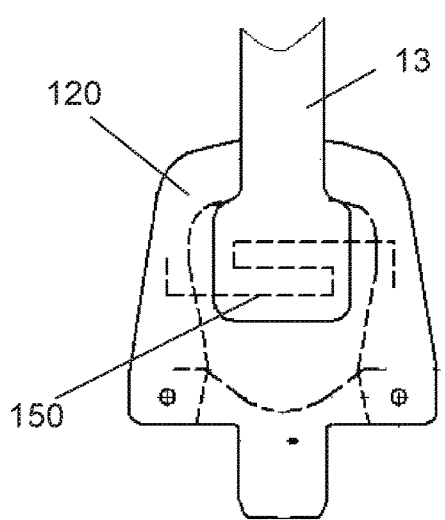
FIG. 28 depicts a holding element manufactured from the cutting of FIG. 27 and a tether sewn to the same.
Figure 27:
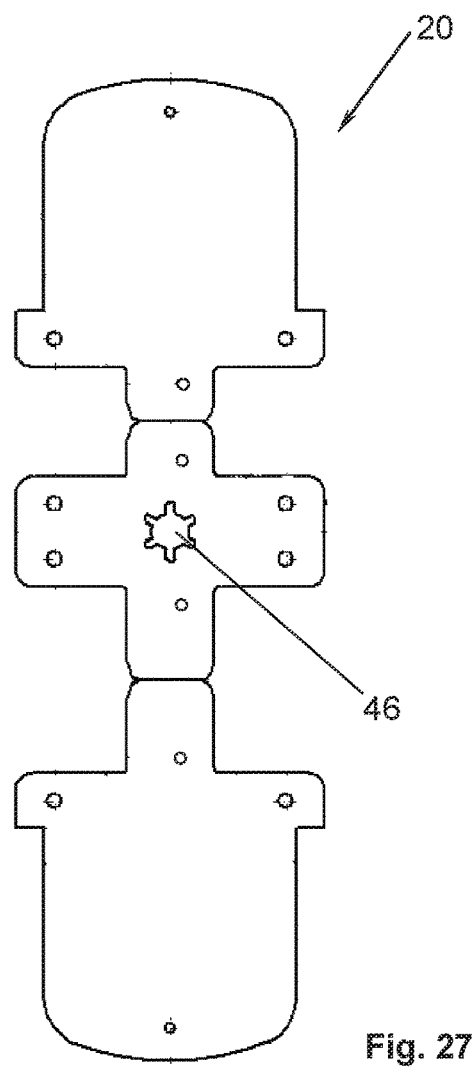
FIG. 27 depicts another embodiment of a cutting in a representation according to FIG. 3.
Figure 32:
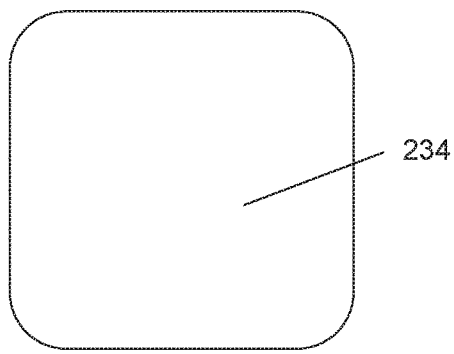

FIG. 27 shows another alternative embodiment of the cutting 20 and FIG. 28 shows the holding element 120 manufactured from this cutting. Here, the hole 46 is star-shaped and the tear seam 150 extends back and forth (is meander-shaped). As has already been mentioned, various forms of the hole are possible in all embodiments disclosed herein.

FIGS. 29-37 show a different embodiment of a holding element 320 in a rather schematic representation according to the description of the first embodiment (FIGS. 3-16). The main difference between this second embodiment and the first embodiment is that the inlay 340 is not double-layered, but rather single-layered. In the example shown for this second embodiment, the holding element 320 is not formed from a single cutting (but which might also be possible) but from two separate cuttings, namely, a cutting 220 for the side walls of the holding element and an additional cutting 240 forming the single-layered inlay. The cutting 220 for the side walls has a first side wall section 232 and a second side wall section 234. The additional cutting 240 shows a hole 246, which is preferably also laser-cut or punched out, wherein layer-cutting is also preferred here. As can be seen from FIG. 29, the hole 246 may, in some embodiments, be oval-shaped. In some embodiments and implementations, the width of the two cuttings may be the same, or at least substantially the same. Similarly, in some embodiments and implementations, the material can be the same as in the first embodiment.

In a first production step, as shown in FIG. 30, according to some implementations, the additional cutting 240 is placed onto the first side wall section 232. In this state, the first sealing seam 262 connecting the additional cutting 240 with the first side wall section 232 may be applied. This first sealing seam 262 may be located in the upper half of the additional cutting 240 and may start and end at the middle line of the same. This is shown in FIG. 31.

Figure 33:
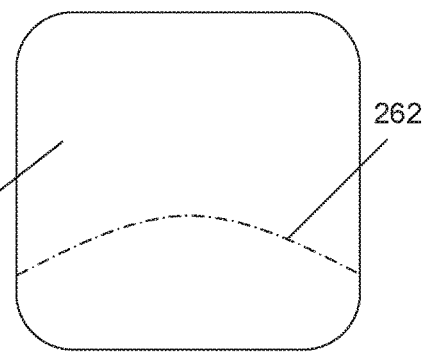
Figure 34:
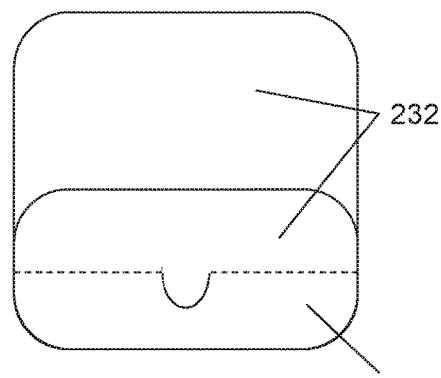
Figure 35:
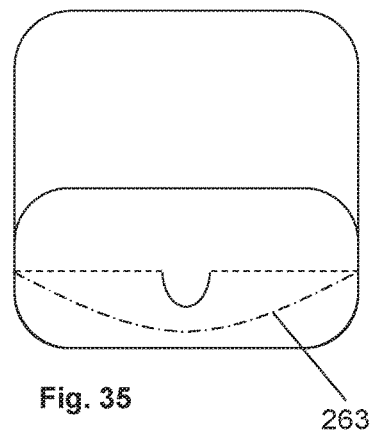

In the next step (FIG. 32), the second side wall section 234 may be folded onto the first side wall section 232 and the additional cutting 240. Then, the assembly may be turned around such that the first side wall section 232 lies on top and the first sealing seam 262 can be seen (FIG. 33). Then, the lower part of the first side wall section 232 may be bent, in some embodiments by 180° or about 180°, such that a lower part of the additional cutting 240 is uncovered, as can be seen in FIG. 34. Then, the second sealing seam 263 may be applied, preferably symmetrically, to the first sealing seam 262. This second sealing seam connects the additional cutting 240 and the second side wall section 234 (FIG. 35).

Figure 36:
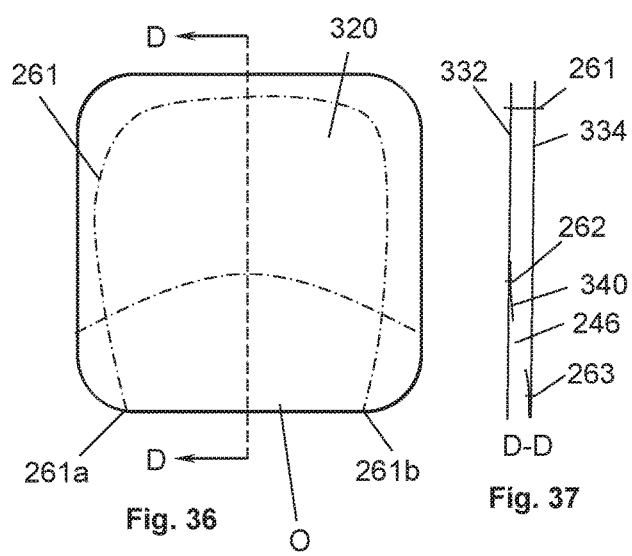
Figure 37:
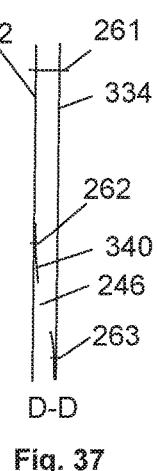
FIG. 37 is a sectional view taken along plane D-D in FIG. 36.
Figure 38:
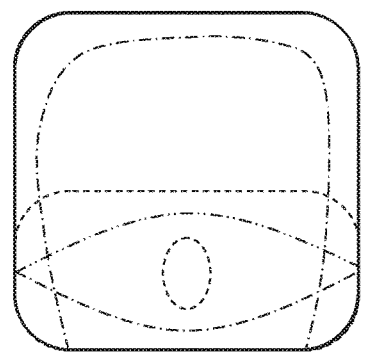
FIG. 38 depicts the holding element of FIG. 37 with hidden lines and seams shown.

Finally, the lower part of the first side wall section 232 may be bent back and the peripheral seam 261 applied. As in the first embodiment, this peripheral seam 261 extends from a first end 261*a* to a second end 261*b* and cuts both sealing seams 262, 263. The two ends 261*a* and 261*b* of the peripheral seam again define an opening O and the hole 246 in the additional cutting 240 (which does now form the single-layered inlay 340) is remote from this opening and is responsible for the sealing when an inflator extends through it, as in the first embodiment. FIG. 37 is a sectional view taken along line D-D in FIG. 36 and shows the first side wall 332 (derived from the first side wall section 232), the second side wall 334 (derived from the second side wall section 234), the inlay 340 (derived from the additional cutting 240), the hole 246 in the inlay 340, the first sealing seam 262, the second sealing seam 263 and the peripheral seam 261. FIG. 38 again shows what is shown in FIG. 36 with all hidden lines and seams shown.

As in the first embodiment, an inflator is inserted through the opening O and through the hole 246 in order to complete the holding unit.

As has already been mentioned, a tether may be sewn to the holding element by means of a weakened portion, such as a tear seam and, in some embodiments, may also be sewn to a section of the airbag cushion and/or a part of a ventilation device. Further, it needs to be mentioned that a holding element as described herein may, in some embodiments, be configured not only for use as an adaptive ventilation device, but, also, or alternatively, for controlling the depth and/or form of the deployed airbag cushion. This applies to all embodiments described herein.

It should also be understood that, in alternative embodiments, at least a portion of the inlay 340 may extend beyond the opposing side walls 332 and 334. Thus, it may be the case in some embodiments that the inlay, such as inlay 340, may only partially extend, rather than wholly extend as depicted in FIG. 37, between the two side walls, such as side walls 332 and 334.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the assembly. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A holding element for attaching an element of an airbag via at least one tear seam, said holding element comprising:
   a first side wall made of a flexible material;
   a second side wall made of a flexible material;
   a peripheral connection connecting the first side wall and the second side wall, said peripheral connection extending from a first end to a second end such that the first side wall, the second side wall and the peripheral connection define a space therebetween and an opening; and
   an inlay having at least one layer being located at least partially between the first side wall and the second side wall, wherein the inlay further comprises a hole, wherein said inlay comprises a double-layered inlay, said double-layered inlay comprising a first layer and a second layer, said first and second layers being connected to each other via a fold, wherein the hole is provided in the double-layered inlay, said hole extending from the first layer over the fold to the second layer, and wherein the fold is remote from the opening such that the inlay divides the space into a main section and an entry section being connected via the hole.

2. The holding element of claim 1, wherein the peripheral connection comprises a peripheral seam.

3. The holding element of claim 1, wherein the hole in the double-layered inlay is one of circular-shaped, star-shaped, and cross-shaped.

4. The holding element of claim 1, further comprising a first sealing connection connecting only the first side wall and the first layer and a second connection connecting only the second side wall and the second layer.

5. The holding element of claim 4, wherein the first sealing connection comprises a first sealing seam, and wherein the second sealing connection comprises a second sealing seam.

6. The holding element of claim 1, wherein the first wall, the second wall, the first layer, and the second layer are made from a single cutting.

7. The holding element of claim 6, wherein the cutting comprises a first side wall section, a second side wall section, and a middle section between the first wall section and the second side wall section, wherein said middle section comprises the hole.

8. The holding element of claim 7, wherein the cutting further comprises a first connecting section extending between the middle section and the first side wall section and a second connecting section extending between the middle section and the second side wall section.

9. The holding element of claim 7, wherein the first side wall is made from the first side wall section, wherein the second side wall is made from the second side wall section, wherein the double-layered inlay is made from the middle section to form a main body of the holding element, wherein a first double-layered extension made from the first connecting section extends from the main body, and wherein a second double-layered extension made from the second connecting section extends from the main body.

10. The holding element of claim 9, wherein the first and second double-layered extensions have different lengths.

11. The holding element of claim 9, wherein at least one of the first and second connecting sections comprises at least two securing holes, and wherein said at least two securing holes are positioned and configured so as to be aligned when the at least one of the first and second connecting sections is folded to at least one of the first double-layered extension and the second double-layered extension.

12. The holding element of claim 1, wherein the hole is a laser-cut hole.

13. A holding unit comprising a holding element and an inflating element, said holding element comprising:
   a first side wall made of a flexible material and a second side wall made of a flexible material;
   a peripheral connection connecting the first side wall and the second side wall, said peripheral connection extending from a first end to a second end, such that the first side wall, the second side wall, and the peripheral connection define a space therebetween and an opening;
   an inlay being located at least in part between the first side wall and the second side wall, said inlay comprising at least one layer, wherein the inlay comprises a hole, wherein said inflating element extends through the opening and through the hole, and wherein the inlay comprises a single-layered inlay having only a single layer; and
   a first sealing connection connecting only the first side wall and the single layer and a second connection connecting only the second side wall and the single layer.

14. The holding element of claim 13, wherein the inflating element comprises a pyrotechnic squib.

* * * * *